(12) United States Patent
Gion et al.

(10) Patent No.: US 10,150,491 B2
(45) Date of Patent: Dec. 11, 2018

(54) DEVICE AND METHOD FOR CONTROLLING TRAIN

(71) Applicant: RAILWAY TECHNICAL RESEARCH INSTITUTE, Kokubunji-shi, Tokyo (JP)

(72) Inventors: Akihiro Gion, Kokubunji (JP); Masahiko Samizo, Kokubunji (JP); Kazutoshi Sato, Kokubunji (JP)

(73) Assignee: RAILWAY TECHNICAL RESEARCH INSTITUTE, Tokyo (JP)

( * ) Notice: Subject to any disclaimer, the term of this patent is extended or adjusted under 35 U.S.C. 154(b) by 75 days.

(21) Appl. No.: 15/274,703

(22) Filed: Sep. 23, 2016

(65) Prior Publication Data

US 2017/0008541 A1    Jan. 12, 2017

Related U.S. Application Data

(63) Continuation of application No. PCT/JP2015/057139, filed on Mar. 11, 2015.

(30) Foreign Application Priority Data

Mar. 27, 2014   (JP) ................. 2014-065279

(51) Int. Cl.
*B61L 23/14*      (2006.01)
*B60L 3/00*       (2006.01)
(Continued)

(52) U.S. Cl.
CPC ............... *B61L 23/14* (2013.01); *B60L 3/00* (2013.01); *B60L 15/36* (2013.01); *B60L 15/40* (2013.01);
(Continued)

(58) Field of Classification Search
CPC ...... B61L 23/14; B61L 25/021; B61L 25/025; B61L 2201/00; B61L 2205/04;
(Continued)

(56) References Cited

U.S. PATENT DOCUMENTS

2007/0131486 A1*  6/2007 Yamagishi .............. B66B 5/022
                                                                              187/313
2015/0009331 A1*  1/2015 Venkatraman ........ B61L 23/041
                                                                              348/148

FOREIGN PATENT DOCUMENTS

JP    2000-013925 A      1/2000
JP    2008187809 A  *  8/2008
(Continued)

*Primary Examiner* — Behrang Badii
*Assistant Examiner* — Daniel L Greene
(74) *Attorney, Agent, or Firm* — Muncy, Geissler, Olds & Lowe, P.C.

(57) ABSTRACT

An on-board device controls the speed of the control target train so that the control target train is set to a given speed-controlled state upon reception of an earthquake detection signal, the given speed-controlled state being a state in which the speed of the control target train is set to be equal to or lower than a reduced speed, or the control target train is stopped. A speed control part estimates an estimated position and an estimated timing at which the control target train is set to a speed-controlled state when a given brake is continuously applied, and controls the speed of the control target train based on the positional relationship between the estimated position and a recommended avoiding-train-existence section when there is a time allowance between the estimated timing and the estimated earthquake arrival timing.

7 Claims, 6 Drawing Sheets

(51) Int. Cl.
*B60L 15/40* (2006.01)
*B61D 1/00* (2006.01)
*B60L 15/36* (2006.01)
*B61L 25/02* (2006.01)

(52) U.S. Cl.
CPC .............. *B61D 1/00* (2013.01); *B61L 25/021* (2013.01); *B61L 25/025* (2013.01); *B60L 2200/26* (2013.01); *B60L 2240/12* (2013.01); *B60L 2260/50* (2013.01); *B61L 2201/00* (2013.01); *B61L 2205/04* (2013.01)

(58) Field of Classification Search
CPC ........ B60L 3/00; B60L 15/36; B60L 2200/26; B60L 2240/12; B60L 2260/50; B60L 15/40; B61D 1/00
See application file for complete search history.

(56) References Cited

FOREIGN PATENT DOCUMENTS

| | | |
|---|---|---|
| JP | 2008-231787 A | 10/2008 |
| JP | 2011-255821 A | 12/2011 |
| JP | 2012-183853 A | 9/2012 |

\* cited by examiner

| SECTION NAME | SECTION (START POINT TO END POINT) | DIRECTION | RECOMMENDATION LEVEL | | | | |
|---|---|---|---|---|---|---|---|
| | | | INTENSITY 5 LOWER | INTENSITY 5 UPPER | INTENSITY 6 LOWER | INTENSITY 6 UPPER | INTENSITY 7 OR HIGHER |
| AZ1 | ○○~○○ | UP | 1 | 1 | 2 | 2 | 3 |
| AZ2 | ○○~○○ | UP | 1 | 1 | 1 | 1 | 2 |
| AZ3 | ○○~○○ | DOWN | 2 | 2 | 3 | 3 | 3 |
| ⋮ | ⋮ | ⋮ | ⋮ | ⋮ | ⋮ | ⋮ | ⋮ |

| REGIONAL NAME | KILOMETERAGE RANGE |
|---|---|
| △△CITY | ○○~○○ |
| △×TOWN | ○○~○○ |
| ××CITY | ○○~○○ |
| ⋮ | ⋮ |

FIG.10

DEVICE AND METHOD FOR CONTROLLING TRAIN

CROSS REFERENCE TO RELATED APPLICATION

This application is a continuation of International Patent Application No. PCT/JP2015/057139, having an international filing date of Mar. 11, 2015, which designated the United States, the entirety of which is incorporated herein by reference. Japanese Patent Application No. 2014-065279 filed on Mar. 27, 2014 is also incorporated herein by reference in its entirety.

BACKGROUND

A railroad (railway) system is basically designed to immediately stop a train when an earthquake has occurred. For example, JP-A-2012-183853 discloses a method that stops a train upon detection of an earthquake by stopping power supply, or causes a train that has received earthquake information transmitted from a ground device to apply a brake.

A known railroad system is normally designed to cause a train to apply an emergency brake when an earthquake has occurred in order to stop the train as early as possible. Specifically, the train may stop at an undesired position (section) (i.e., a position (section) at which a train should not be situated when an earthquake has occurred) (e.g., a position (section) on a bridge situated at a considerable height, a section situated near a slope of a mountain, and a section situated in the deepest area of a long tunnel).

The speed of a train may be reduced when an earthquake has occurred instead of stopping the train. In this case, however, since the speed of the train is reduced by applying an emergency brake or a maximum service brake, the above problem also occurs.

SUMMARY

According to one aspect of the invention, there is provided a train control device that is installed in a train, and controls a speed of the train, the train control device comprising:

a communication part that receives an earthquake detection signal from outside the train, the earthquake detection signal including information about an estimated earthquake arrival timing, the estimated earthquake arrival timing being a timing at which an earthquake arrives at a position of the train, or a region including the position of the train; and a speed control part that controls the speed of the train so that the train is set to a given speed-controlled state when the earthquake detection signal has been received, the speed control part estimating an estimated position and an estimated timing at which the train is set to the speed-controlled state when a given brake is continuously applied, and controlling the speed of the train based on a positional relationship between the estimated position and a given recommended avoiding-train-existence section when there is a time allowance between the estimated timing and the estimated earthquake arrival timing.

According to another aspect of the invention, there is provided a control method that causes a control device that is installed in a train to control a speed of the train, the control method comprising:

receiving an earthquake detection signal from outside the train, the earthquake detection signal including information about an estimated earthquake arrival timing, the estimated earthquake arrival timing being a timing at which an earthquake arrives at a position of the train, or a region including the position of the train;

estimating an estimated position and an estimated timing at which the train is set to a given speed-controlled state when a given brake is continuously applied, when the earthquake detection signal has been received; and controlling the speed of the train based on a positional relationship between the estimated position and a given recommended avoiding-train-existence section when there is a time allowance between the estimated timing and the estimated earthquake arrival timing.

DESCRIPTION OF EXEMPLARY EMBODIMENTS

Several embodiments of the invention may provide technology that implements a novel train control process that deals with the occurrence of an earthquake.

According to one embodiment of the invention, there is provided a train control device that is installed in a train, and controls a speed of the train, the train control device comprising:

a communication part that receives an earthquake detection signal from outside the train, the earthquake detection signal including information about an estimated earthquake arrival timing, the estimated earthquake arrival timing being a timing at which an earthquake arrives at a position of the train, or a region including the position of the train; and a speed control part that controls the speed of the train so that the train is set to a given speed-controlled state when the earthquake detection signal has been received, the speed control part estimating an estimated position and an estimated timing at which the train is set to the speed-controlled state when a given brake is continuously applied, and controlling the speed of the train based on a positional relationship between the estimated position and a given recommended avoiding-train-existence section when there is a time allowance between the estimated timing and the estimated earthquake arrival timing.

According to another embodiment of the invention, there may be provided a control method that causes a control device that is installed in a train to control a speed of the train, the control method comprising:

receiving an earthquake detection signal from outside the train, the earthquake detection signal including information about an estimated earthquake arrival timing, the estimated earthquake arrival timing being a timing at which an earthquake arrives at a position of the train, or a region including the position of the train;

estimating an estimated position and an estimated timing at which the train is set to a given speed-controlled state when a given brake is continuously applied, when the earthquake detection signal has been received; and controlling the speed of the train based on a positional relationship between the estimated position and a given recommended avoiding-train-existence section when there is a time allowance between the estimated timing and the estimated earthquake arrival timing.

According to the above configuration, the speed of the train is controlled so that the train is set to the given speed-controlled state when the earthquake detection signal that includes the information about the estimated earthquake arrival timing has been received. In this case, the estimated position and the estimated timing at which the train is set to the speed-controlled state when the given brake (e.g., emergency brake or maximum service brake) is continuously applied, are estimated. The speed of the train is controlled based on the positional relationship between the estimated position and the recommended avoiding-train-existence section when there is a time allowance between the estimated timing and the estimated earthquake arrival timing. The term "recommended avoiding-train-existence section" used herein refers to a section within a line section of a train that is recommended to be avoiding-train-existence when an earthquake has occurred (arrived) (e.g., a section on a bridge situated at a considerable height, and a section situated in the deepest area of a long tunnel).

The above configuration makes it possible to implement novel train control technology that can set the train to the speed-controlled state at the estimated earthquake arrival timing at a position outside the recommended avoiding-train-existence section when there is a time allowance until the train is set to the speed-controlled state.

The train control device may be configured so that the speed control part calculates a speed control pattern that causes the train to be situated at a position beyond an end point of the recommended avoiding-train-existence section at the estimated earthquake arrival timing in a state in which the train is set to the speed-controlled state when the estimated position is included within the recommended avoiding-train-existence section, and controls the speed of the train based on the speed control pattern.

This makes it possible to control the speed of the train so that the train is set to the speed-controlled state at the estimated earthquake arrival timing after passing the recommended avoiding-train-existence section when the estimated position at which the train is set to the speed-controlled state (when the given brake is continuously applied) is included within the recommended avoiding-train-existence section.

More specifically, the train control device may be configured so that the speed control part calculates the speed control pattern so as to include either or both of acceleration and coasting based on a distance from the estimated position to the end point of the recommended avoiding-train-existence section, the time allowance, a current travel state, and a travel performance specification of the train.

According to another aspect of the invention, there may be provided one of the above train control device, wherein the earthquake detection signal includes information about an earthquake index value that is an index value that represents a magnitude of the earthquake, the train control device further comprising a storage part that stores a recommendation level that corresponds to the earthquake index value so as to be linked to the recommended avoiding-train-existence section, wherein the speed control part selects the recommended avoiding-train-existence section based on the recommendation level that corresponds to the earthquake index value that is included in the received earthquake detection signal, and calculates the speed control pattern with respect to the selected recommended avoiding-train-existence section.

According to this configuration, the recommendation level that corresponds to the earthquake index value is stored so as to be linked to the recommended avoiding-train-existence section, and the recommended avoiding-train-existence section is selected based on the recommendation level that corresponds to the earthquake index value that is included in the received earthquake detection signal. This makes it possible to appropriately select the recommended avoiding-train-existence section corresponding to the magnitude of the earthquake.

According to another aspect of the invention, there is provided one of the above train control devices, wherein the speed control part causes the train to apply a brake that is reduced in deceleration as compared with the given brake when the estimated position is situated anterior to a start point of the recommended avoiding-train-existence section so that the train is situated anterior to the start point at the estimated earthquake arrival timing.

This makes it possible to brake the train by applying a brake that is reduced in deceleration as compared with the given brake when the estimated position is situated anterior to the start point of the recommended avoiding-train-existence section so that the train is situated anterior to the start point at the estimated earthquake arrival timing. Therefore, it is possible to reduce the inertial force applied to the passengers by reducing sudden braking when an earthquake has occurred while preventing a situation in which the train is situated within the recommended avoiding-train-existence section at the estimated earthquake arrival timing.

According to another aspect of the invention, there is provided a train control devices, a passing train travel state information acquisition part that acquires passing train travel state information that includes a travel position of a passing train, wherein the speed control part estimates the travel position of the passing train at the estimated timing based on the passing train travel state information, and controls the speed of the train using a given range including the estimated travel position of the passing train as the recommended avoiding-train-existence section.

This makes it possible to control the speed of the train so that the train is not situated within the given range including the travel position of the passing train when an earthquake has occurred (arrived).

DESCRIPTION OF EMBODIMENTS

An on-board device 10 (i.e., train control device) according to the exemplary embodiments of the invention is described below. The on-board device 10 is a device that is installed in a train, and controls the speed of the train when an earthquake detection signal has been received from a ground device 20 that is provided at a location outside the train. Note that a train in which the on-board device 10 is installed is hereinafter appropriately referred to as "control target train". Note that the control target train may be a train with an electrical locomotive, a train with another type of locomotive, a levitated train, or the like.

The configuration of the on-board device 10 is described below.

Figure 1:
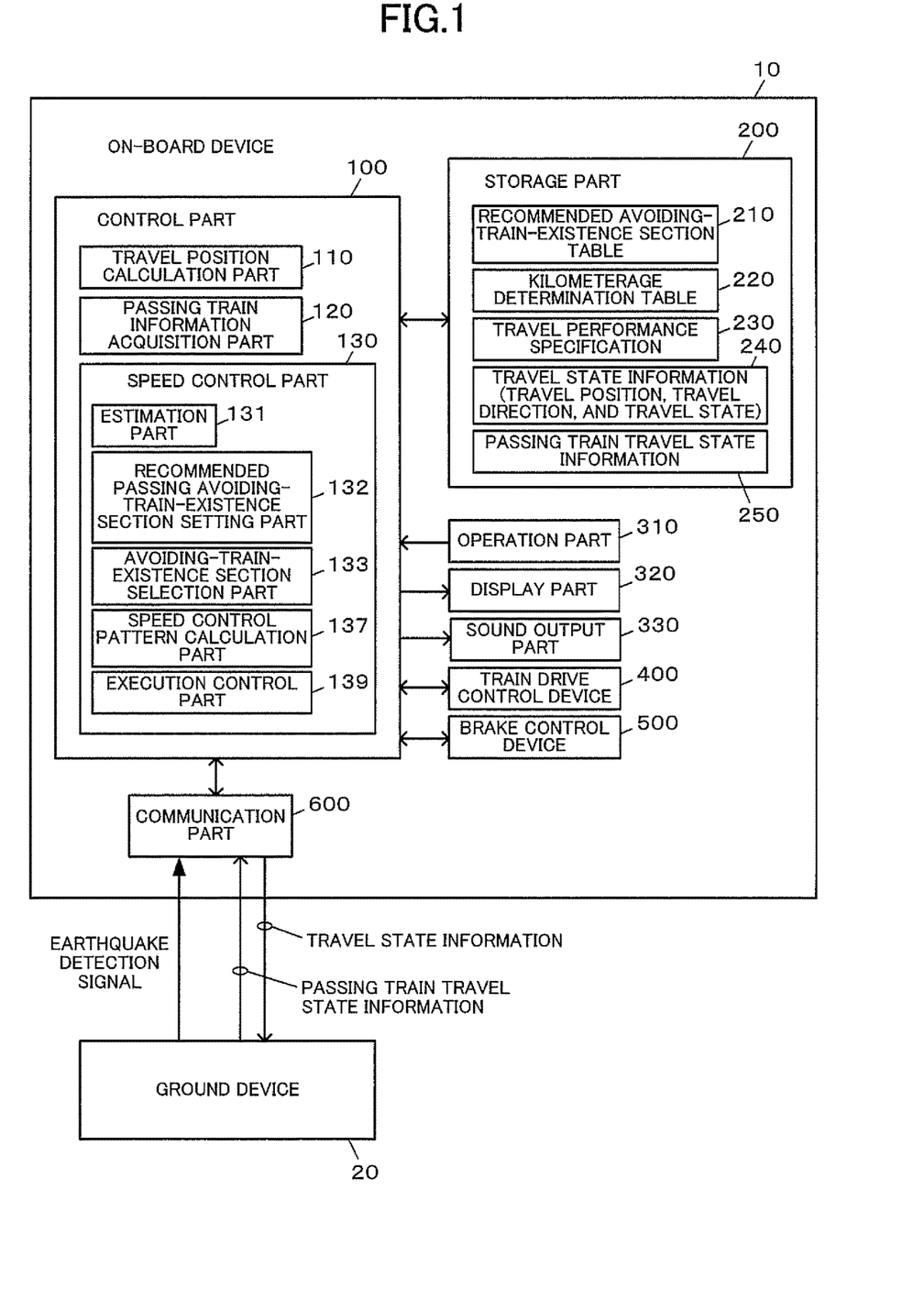
FIG. 1 is a block diagram illustrating the functional configuration of an on-board device.

FIG. 1 is a block diagram illustrating the functional configuration of the on-board device 10. The on-board device 10 includes a control part 100, a storage part 200, an operation part 310, a display part 320, a sound output part 330, a train drive control device 400, a brake control device 500, and a communication part 600. The on-board device 10 is configured to be able to communicate with the ground device 20 through a rail, or communicate with the ground device 20 through a leaky coaxial cable that is provided along a railroad track, or communicate with the ground device 20 through wireless communication.

The control part 100 is a functional part that controls the entire on-board device 10, and includes a processor (e.g., central processing unit (CPU)), various electronic circuits, and the like. The control part 100 continually updates travel state information 240, acquires passing train travel state information 250, and performs an earthquake-specific train control process (see FIG. 10) according to a train control program, for example. The control part 100 includes a travel position calculation part 110, a passing train information acquisition part 120, and a speed control part 130 as the main functional parts.

The travel position calculation part 110 determines the position (kilometerage (distance (km))) of the control target train on the railroad track based on the output from a tacho-generator that is attached to the axle, a GPS positioning device, or the like. For example, a PG signal that is output from a tacho-generator is a voltage signal having a frequency proportional to the speed. Therefore, the travel position (e.g., kilometerage) of the control target train can be calculated by multiplying the speed represented by the PG signal by the wheel diameter of the control target train and the unit time to calculate the moving distance per unit time, and calculating the cumulative moving distance. A GPS positioning device outputs position information (that represents latitude and longitude) in the terrestrial reference frame. Therefore, the travel position of the control target train can be calculated by comparing the latitude and the longitude represented by the position information with railroad track map information in which the position (kilometerage) of each point is recorded. It is also possible to use three-dimensional position information that represents latitude, longitude, and elevation.

The control part 100 continually updates the travel state information 240 that includes information about the travel position calculated by the travel position calculation part 110, information about the travel state (e.g., travel speed and notch operation information), information about the travel direction (up/down), and the like. The control part 100 continually transmits the latest travel state information 240 to the ground device 20 through the communication part 600.

The passing train information acquisition part 120 continually receives the passing train travel state information 250 from the ground device 20, the passing train travel state information 250 representing the travel state of an oncoming train (i.e., passing train) that travels side by side with the control target train so as to pass the control target train in the direction opposite to the travel direction of the control target train, or an overtaking train (i.e., passing train) that travels side by side with the control target train so as to pass the control target train in the same direction as the travel direction of the control target train, for example. The passing train travel state information 250 includes information about the travel position, the travel line section, the travel section, the travel direction, the travel speed, the presumed stop position during an emergency stop, the presumed stop section during an emergency stop, and the like with respect to the passing train. The ground device 20 receives and collects the travel state information from each train that travels within the corresponding line section, and continually transmits the travel state information about each passing train to each train that travels within the corresponding line section.

The speed control part 130 controls the speed of the control target train so that the control target train is set to a given speed-controlled state upon reception of the earthquake detection signal, the given speed-controlled state being a state in which the speed of the control target train is set to be equal to or lower than a reduced speed, or the control target train is stopped. The earthquake detection signal is received from the ground device 20, for example. When the ground device 20 has received a warning (earthquake early warning information) from a known earthquake warning system (e.g., earthquake early warning system), the ground device 20 determines the estimated earthquake arrival timing (time allowance) and the estimated seismic intensity with respect to the travel position of each train within the corresponding line section, or a region including the travel position of each train within the corresponding line section, generates the earthquake detection signal that includes the information thus determined, and transmits the generated earthquake detection signal to the on-board device 10 installed in each train. Specifically, the earthquake detection signal is transmitted to the control target train before an earthquake that has occurred reaches the control target train, and includes the estimated earthquake arrival timing and the estimated seismic intensity. Note that the estimated seismic intensity is an example of an index value (earthquake index value) that represents the magnitude of an earthquake. Another index value (e.g., acceleration (Gal)) that represents the magnitude of an earthquake that reaches each point may also be used.

The on-board device 10 may receive a warning (earthquake early warning information) directly from a known earthquake warning system through a public wireless communication network, a public telephone network, or the like, and calculate the estimated earthquake arrival timing and the estimated seismic intensity with respect to the control target train.

Figure 3:
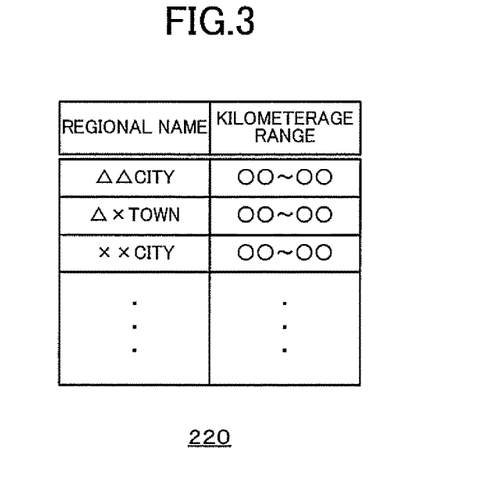
FIG. 3 is a view illustrating an example of a kilometerage determination table.

The earthquake detection signal may include the estimated earthquake arrival timing and the estimated seismic intensity with respect to a plurality of regions. In this case, the earthquake detection signal includes information about the estimated earthquake arrival timing and the estimated seismic intensity on a regional basis. The on-board device 10 may store a kilometerage determination table 220 (see FIG. 3) in the storage part 200, and convert the kilometerage from the information about each region included in the earthquake detection signal to determine the estimated earthquake arrival timing and the estimated seismic intensity at each position on the railroad track.

When the on-board device 10 has received the earthquake detection signal, the speed control part 130 estimates the estimated position and the estimated timing at which the control target train is set to the speed-controlled state when a given brake (e.g., emergency brake or maximum service brake) is immediately and continuously applied in the current travel state. The speed control part 130 determines whether or not there is a time allowance between the estimated timing and the estimated earthquake arrival timing represented by (included in) the earthquake detection signal, and controls the speed of the control target train based on the positional relationship between the estimated position and a recommended avoiding-train-existence section when there is a time allowance between the estimated timing and the estimated earthquake arrival timing.

Figure 2:
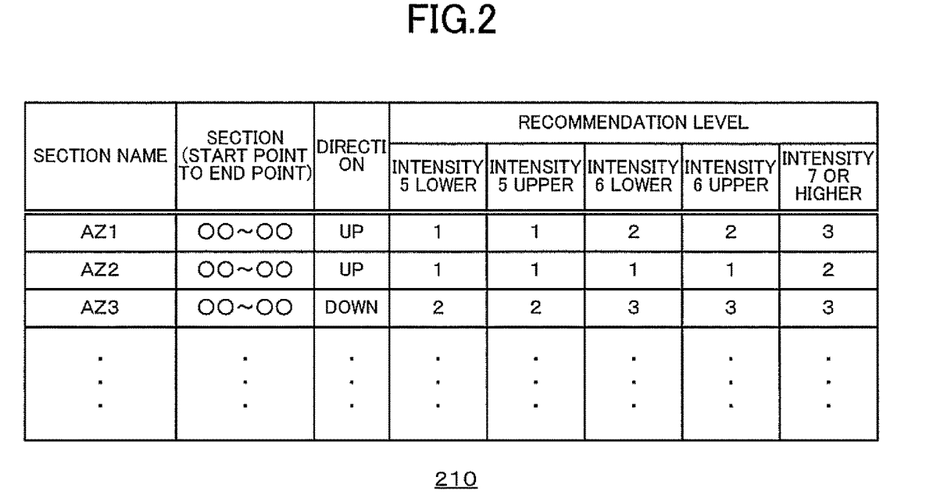
FIG. 2 is a view illustrating an example of a recommended avoiding-train-existence section table.

The term "recommended avoiding-train-existence section" used herein refers to a section that is recommended to be avoiding-train-existence when an earthquake has occurred (arrived) (e.g., a section on a bridge situated at a considerable height, a section situated near a slope of a mountain, and a section situated in the deepest area of a long tunnel). The recommended avoiding-train-existence section is stored (set) in advance in a recommended avoiding-train-existence section table 210. FIG. 2 is a view illustrating a configuration example of the recommended avoiding-train-existence section table 210. The recommended avoiding-train-existence section table 210 stores a section name that is identification information about each section, the position (kilometerage) of the start point and the end point of each section, a direction (up/down), and a recommendation level in a linked manner. The recommendation level is set to be higher as the degree by which it is recommended to be avoiding-train-existence increases. In one embodiment of the invention, the recommendation level is set on a seismic intensity (earthquake index value) basis. Note that the positions that define each section may be specified using the coordinates in the terrestrial reference frame (e.g., latitude and longitude, or latitude, longitude, and elevation) instead of using the kilometerage. In this case, it is desirable to additionally provide a functional section that calculates the kilometerage from the coordinates, and calculates the coordinates from the kilometerage.

The train control process according to the exemplary embodiments of the invention is described below with reference to FIGS. 4 to 9. FIGS. 4 to 9 illustrate an example of the speed control process when there is a time allowance, and the earthquake detection signal has been received when the train is situated at the position illustrated in each drawing. Note that the train moves in the horizontal direction (horizontal axis direction), each curve represents the speed control pattern applied to the train, the bold solid line represents the recommended avoiding-train-existence section, and the black triangles indicate the start point and the end point of the recommended avoiding-train-existence section.

Figure 4:
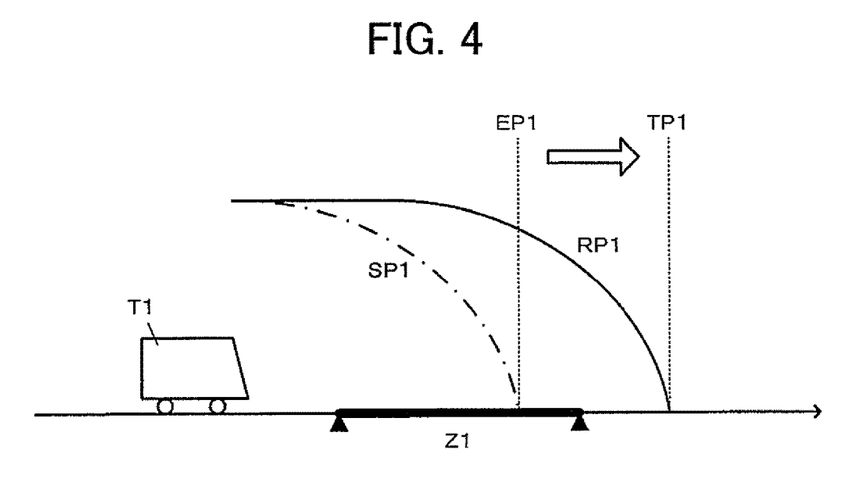
FIG. 4 is a view illustrating an example of a train control process according to one embodiment of the invention.

FIG. 4 illustrates an example of the train control process when the control target train can pass a recommended avoiding-train-existence section Z1 within the time allowance. In FIG. 4, reference sign SP1 indicates a speed control pattern when a control target train T1 immediately and continuously applies the given brake in the current travel state. The speed control pattern SP1 is a braking curve. According to the speed control pattern SP1, the estimated position at which the control target train T1 is set to the speed-controlled state is a position EP1 that is situated within the recommended avoiding-train-existence section Z1. The on-board device 10 calculates the distance between the end point of the recommended avoiding-train-existence section Z1 and the estimated position EP1. The on-board device 10 determines whether or not the control target train T1 can be moved posterior to the end point of the recommended avoiding-train-existence section Z1 (i.e., whether or not the control target train T1 can be moved beyond the end point of the recommended avoiding-train-existence section Z1) through either or both of acceleration and coasting using the calculated distance, the time allowance, the current travel state, and a travel performance specification (travel performance data) 230 of the control target train T1, and calculates a speed control pattern RP1 when the control target train T1 can be moved posterior to the end point of the recommended avoiding-train-existence section Z1. Specifically, the on-board device 10 calculates the speed control pattern RP1 that causes the control target train T1 to pass the recommended avoiding-train-existence section Z1. The on-board device 10 then controls the speed of the control target train T1 according to the speed control pattern RP1. The control target train T1 can thus be placed at a position TP1 (that is situated posterior to the end point of the recommended avoiding-train-existence section Z1) at the estimated earthquake arrival timing in the speed-controlled state.

Although FIG. 4 illustrates an example in which the speed control pattern RP1 temporarily maintains the current travel speed, and then continuously applies the given brake, the on-board device 10 may calculate a speed control pattern that temporarily accelerates the control target train T1, or allows the control target train T1 to coast, or reduces the deceleration.

Figure 5:
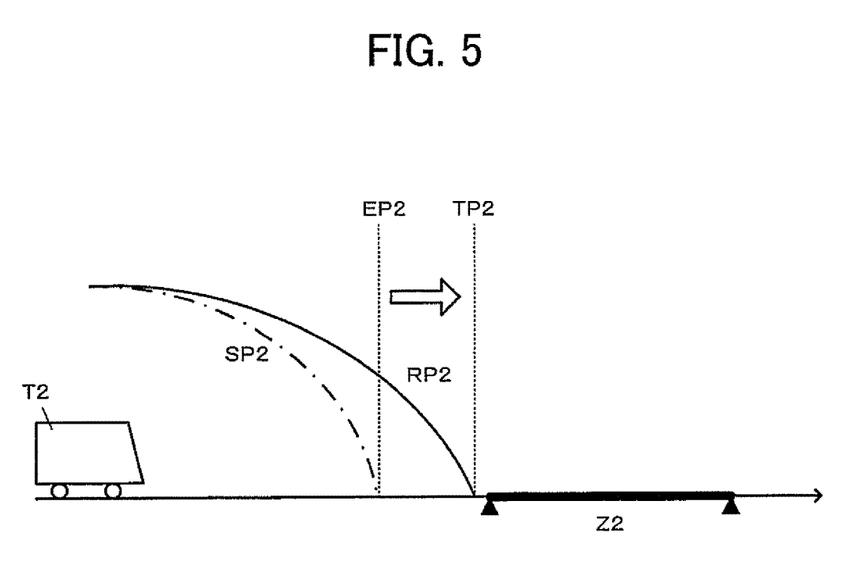
FIG. 5 is a view illustrating an example of a train control process according to one embodiment of the invention.

FIG. 5 illustrates an example of the train control process that controls the speed of a control target train T2 using a speed control pattern that reduces the deceleration since the control target train T2 is not situated within a recommended avoiding-train-existence section Z2 even when the control target train T2 immediately and continuously applies the given brake. According to a speed control pattern SP2 that causes the control target train T2 to immediately and continuously apply the given brake, the estimated position at which the control target train T2 is set to the speed-controlled state is a position EP2 that is situated anterior to the start point of the recommended avoiding-train-existence section Z2. Therefore, the deceleration is reduced so that the control target train T2 is set to the speed-controlled state at the estimated earthquake arrival timing at a position that is situated anterior to the start point of the recommended avoiding-train-existence section Z2 in order to reduce the inertial force applied to the passengers due to application of the given brake. In the example illustrated in FIG. 5, a speed control pattern RP2 that is more gently curved as compared with the original speed control pattern SP2 is calculated, and the speed of the control target train T2 is controlled according to the speed control pattern RP2. The control target train T2 is set to the speed-controlled state at the estimated earthquake arrival timing at a position TP2 that is situated anterior to the recommended avoiding-train-existence section Z2.

Figure 6:
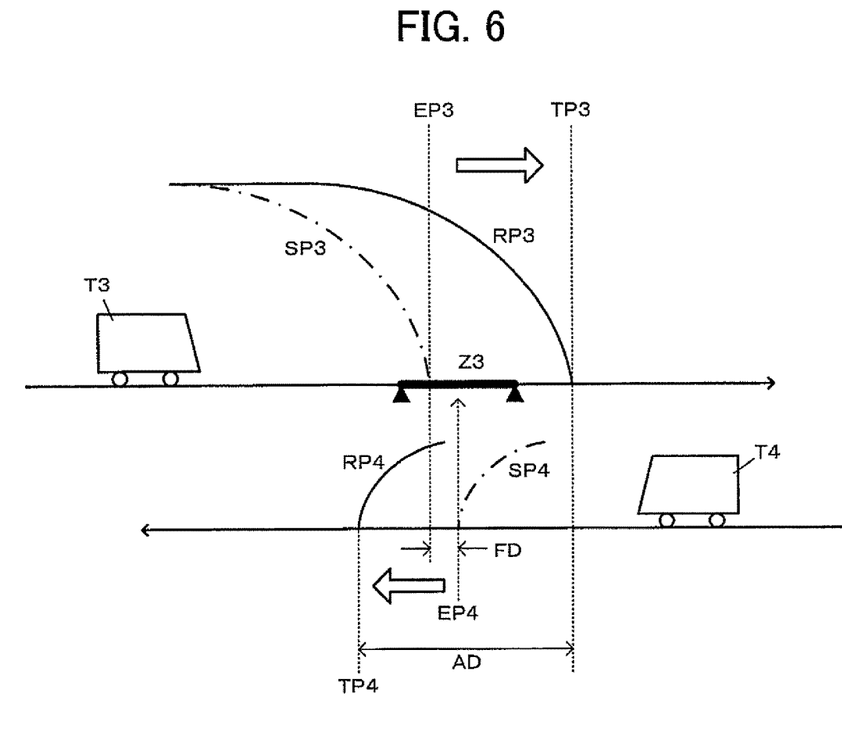
FIG. 6 is a view illustrating an example of a train control process according to one embodiment of the invention.

FIG. 6 is a view illustrating an example in which the speed of a control target train T3 is controlled while taking account of a passing train T4. The passing train T4 is an oncoming train. According to a speed control pattern SP4 that causes the passing train T4 to immediately and continuously apply the given brake, the estimated position at which the passing train T4 is set to the speed-controlled state is a position EP4. The on-board device 10 installed in the control target train T3 sets a recommended passing avoiding-train-existence section Z3 based on the estimated position EP4 at which the passing train T4 is set to the speed-controlled state in order to avoid a situation in which the control target train T3 and the passing train T4 pass each other at the estimated earthquake arrival timing and during a given time (e.g., 30 seconds or 1 minute) subsequent to the estimated earthquake arrival timing. For example, the on-board device 10 directly uses the kilometerage of the estimated position EP4 while changing only the up/down direction, and sets a given range (e.g., 1 km) around the kilometerage to be the recommended passing avoiding-train-existence section Z3. Note that the recommended passing avoiding-train-existence section Z3 may be set using information about the position or the section where the passing train T4 may stop (e.g., information about the presumed stop position or the presumed stop section included in the passing train travel state information 250), information about a recommended passing avoiding-train-existence section that is set in advance at a position in front of the passing train in the travel direction, or the like instead of the estimated position EP4.

According to a speed control pattern SP3 that causes the control target train T3 to immediately and continuously apply the given brake, the estimated position at which the control target train T3 is set to the speed-controlled state is a position EP3. The estimated position EP3 is situated within the recommended avoiding-train-existence section Z3. Therefore, the on-board device 10 calculates a speed control pattern RP3 in the same manner as described above with reference to FIG. 4, and controls the speed of the control target train T3 according to the speed control pattern RP3. The control target train T3 can thus be set to the speed-controlled state at the estimated earthquake arrival timing at a position at which the control target train T3 and the passing train T4 do not pass each other.

Note that the on-board device 10 installed in the passing train T4 also performs the same process as that performed by the on-board device 10 installed in the control target train T3.

Figure 7:
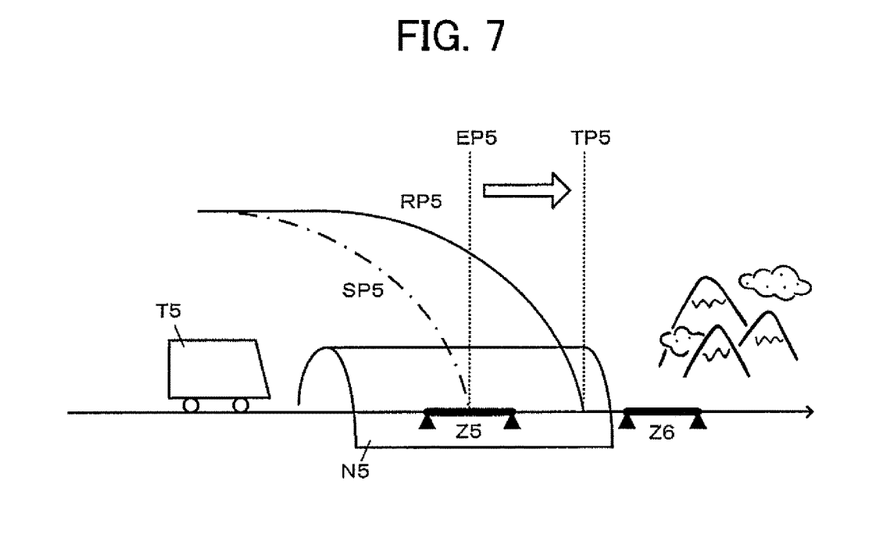
FIG. 7 is a view illustrating an example of a train control process according to one embodiment of the invention.

FIG. 7 is a view illustrating an example of the train control process when a plurality of recommended avoiding-train-existence sections are provided. A recommended avoiding-train-existence section Z5 is set to a deep area within a tunnel, and a recommended avoiding-train-existence section Z6 is set to an area which is situated away from the exit of the tunnel and in which precipices are present near the railroad track. The recommended avoiding-train-existence section Z5 and the recommended avoiding-train-existence section Z6 do not overlap each other, and another recommended avoiding-train-existence section is not set between the recommended avoiding-train-existence section Z5 and the recommended avoiding-train-existence section Z6.

The on-board device 10 basically performs the train control process that causes the control target train to pass the recommended avoiding-train-existence section when the control target train can pass the recommended avoiding-train-existence section before the estimated earthquake arrival timing is reached (as described above with reference to FIG. 4). The on-board device 10 calculates a speed control pattern RP5 so that the control target train that has passed the recommended avoiding-train-existence section is not situated within another recommended avoiding-train-existence section at the estimated earthquake arrival timing. In the example illustrated in FIG. 7, the speed control pattern RP5 is calculated so that the control target train is set to the speed-controlled state at a position TP5 between the recommended avoiding-train-existence section Z5 and the recommended avoiding-train-existence section Z6.

Figure 8:
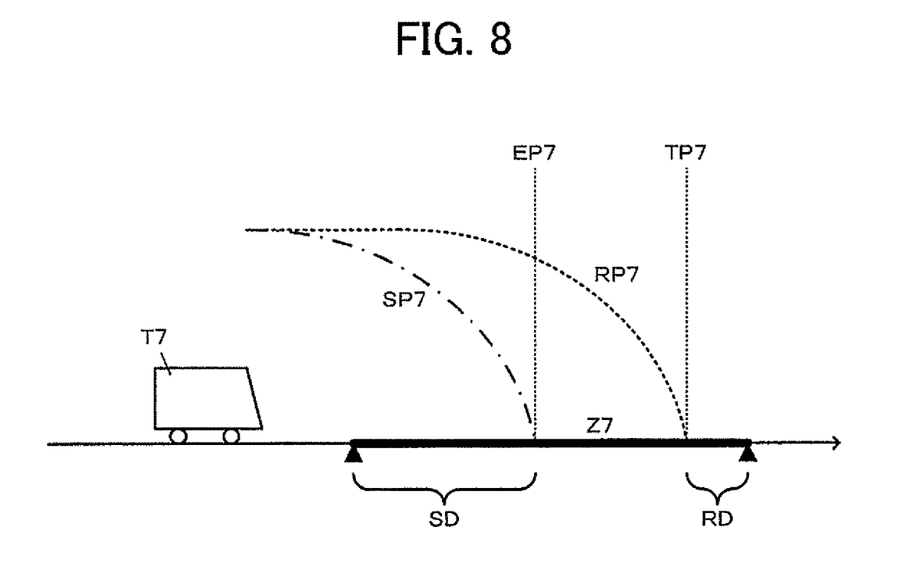
FIG. 8 is a view illustrating an example of a train control process according to one embodiment of the invention.

FIG. 8 is a view illustrating an example of the train control process when the estimated position at which the control target train is set to the speed-controlled state is situated within the recommended avoiding-train-existence section, and the control target train cannot pass the recommended avoiding-train-existence section before the estimated earthquake arrival timing is reached. According to a speed control pattern SP7 that causes a control target train T7 to immediately and continuously apply the given brake, the estimated position at which the control target train T7 is set to the speed-controlled state is a position EP7 that is situated within a recommended avoiding-train-existence section Z7. According to a speed control pattern RP7 that is calculated so that the position at which the control target train T7 is set to the speed-controlled state at the estimated earthquake arrival timing is moved in advance as much as possible taking account of the time allowance, the position (TP7) at which the control target train T7 is set to the speed-controlled state is also situated within the recommended avoiding-train-existence section Z7. In this case, the on-board device 10 calculates a distance SD from the estimated position EP7 to the start point or the end point of the recommended avoiding-train-existence section Z7, whichever is closer to the estimated position EP7, and a distance RD from the position TP7 to the start point or the end point of the recommended avoiding-train-existence section Z7, whichever is closer to the position TP7. The on-board device 10 selects the speed control pattern that corresponds to the position EP7 or the position TP7 that respectively corresponds to the distance SD or the distance RD, whichever is shorter. In the example illustrated in FIG. 8, since the distance SD is longer than the distance RD, the on-board device 10 selects the speed control pattern RP7. The on-board device 10 then controls the speed of the control target train T7 according to the selected speed control pattern RP7.

According to the example illustrated in FIG. 8, it is impossible to place the control target train T7 at a position situated outside the recommended avoiding-train-existence section when the estimated earthquake arrival timing is reached, but it is possible to place the control target train T7 at a position situated close to the start point or the end point of the recommended avoiding-train-existence section when the estimated earthquake arrival timing is reached. Therefore, it is possible to reduce the time required to rescue and guide the passengers after the emergency stop, for example.

Figure 9:
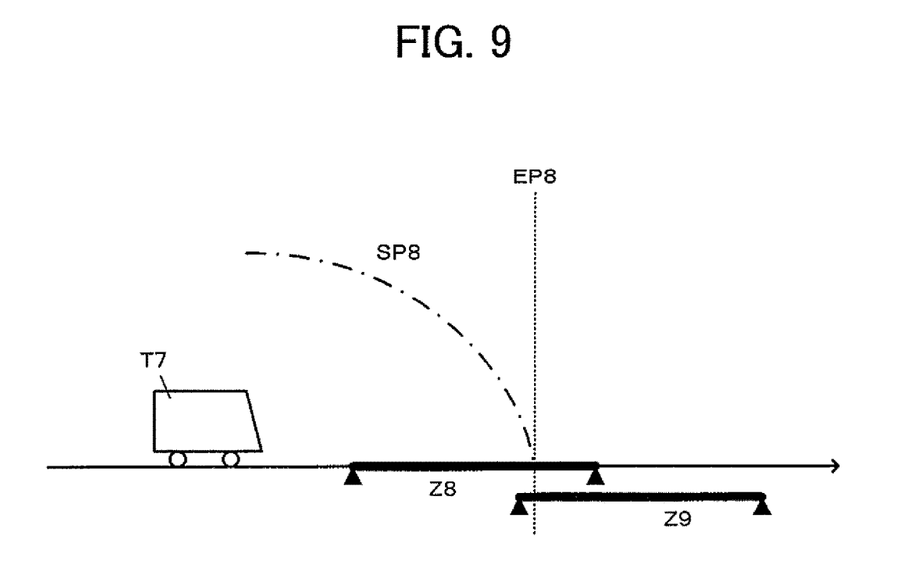
FIG. 9 is a view illustrating an example of a train control process according to one embodiment of the invention.

FIG. 9 is a view illustrating an example of the train control process when a plurality of recommended avoiding-train-existence sections overlap each other, or coincide with each other. In the example illustrated in FIG. 9, a recommended avoiding-train-existence section Z8 and a recommended avoiding-train-existence section Z9 overlap each other.

In this case, the recommended avoiding-train-existence section Z8 and the recommended avoiding-train-existence section Z9 that overlap each other may be considered to be a single (continuous) recommended avoiding-train-existence section, or the recommended avoiding-train-existence section Z8 or the recommended avoiding-train-existence section Z9 may be selected according to a priority level. When employing the former method, the train control process described above with reference to FIGS. 4, 5, and 8 may be applied to the single (continuous) recommended avoiding-train-existence section (that consists of the recommended avoiding-train-existence section Z8 and the recommended avoiding-train-existence section Z9). When employing the latter method, the train control process described above with reference to FIGS. 4, 5, and 8 may be applied to the recommended avoiding-train-existence section that has been selected according to the priority level.

In one embodiment of the invention, a recommended avoiding-train-existence section is selected based on a recommendation level that is included in (set to) the recommended avoiding-train-existence section table 210. More specifically, when the estimated position at which the control target train is set to the speed-controlled state is situated within a plurality of recommended avoiding-train-existence sections, the recommendation level that corresponds to the estimated seismic intensity is determined corresponding to each of the plurality of recommended avoiding-train-existence sections, and the recommended avoiding-train-existence section to which the highest recommendation level is assigned, is selected. In the example illustrated in FIG. 9, the recommended avoiding-train-existence section Z8 or the recommended avoiding-train-existence section Z9 (within which an estimated position T8 at which the control target train T8 is set to the speed-controlled state), whichever is higher with respect to the recommendation level that corresponds to the estimated seismic intensity, is selected. The train control process described above with reference to FIGS. 4, 5, and 8 is applied to the selected recommended avoiding-train-existence section.

Again referring to FIG. 1, the speed control part 130 includes an estimation part 131, a recommended passing avoiding-train-existence section setting part 132, a avoiding-train-existence section selection part 133, a speed control pattern calculation part 137, and an execution control part 139.

The estimation part 131 refers to the travel state information 240, and estimates the estimated position and the estimated timing at which the control target train is set to the speed-controlled state when the given brake (e.g., emergency brake or maximum service brake) is immediately and continuously applied in the current travel state. Note that the deceleration implemented by the given brake is specified by the travel performance specification 230.

The recommended passing avoiding-train-existence section setting part 132 estimates the position at which the passing train is set to the speed-controlled state when the passing train continuously applies the given brake based on the passing train travel state information 250 received from the ground device 20, and sets a given range including the estimated position to be the recommended avoiding-train-existence section in order to prevent a situation in which the control target train and the passing train pass each other at the estimated earthquake arrival timing.

The avoiding-train-existence section selection part 133 selects the recommended avoiding-train-existence section that includes the estimated position estimated by the estimation part 131, and N (e.g., N=1 or 2) recommended avoiding-train-existence sections which are situated closest to and posterior to the estimated position from the recommended avoiding-train-existence sections set to the recommended avoiding-train-existence section table 210 (including the recommended avoiding-train-existence section set by the recommended passing avoiding-train-existence section setting part 132).

The speed control pattern calculation part 137 calculates the speed control pattern so as to be variable using the section (recommended avoiding-train-existence section) selected by the avoiding-train-existence section selection part 133. The speed control pattern calculation part 137 calculates the speed control pattern in the same manner as described above with reference to FIGS. 4 to 9.

The execution control part 139 outputs a control signal to the train drive control device 400 and the brake control device 500 to implement the speed control process that sets the control target train to the speed-controlled state at the estimated timing according to the speed control pattern calculated by the speed control pattern calculation part 137.

The storage part 200 is implemented by a hard disk, an SSD, a memory, or the like. The storage part 200 stores the recommended avoiding-train-existence section table 210 (see FIG. 2), the kilometerage determination table 220 (see FIG. 3), the travel performance specification 230, the travel state information 240, and the passing train travel state information 250. The storage part 200 also stores a program that implements the train control process that is performed when an earthquake has occurred (see FIG. 10).

The travel performance specification 230 includes deceleration-acceleration data such as a braking pattern that represents the relationship between the speed and the deceleration of the control target train, the deceleration that corresponds to a brake notch, the deceleration applied by the emergency brake, the maximum speed, and the maximum acceleration, and car data such as the car weight.

The operation part 310 is implemented by an operation button, a switch, a touch panel, or the like. The operation part 310 is used to set various types of data, and perform (input) an instruction operation. The display part 320 is implemented by a liquid crystal display, an indicator lamp, or the like. The display part 320 displays the processing state, the processing results, and the like with respect to the on-board device 10. The sound output part 330 is implemented by a speaker. For example, the sound output part 330 notifies the user of reception of the earthquake detection signal, the details of the train control process, and the like using sound.

The train drive control device 400 is a device that controls the drive source used to drive the control target train. When the control target train is an electric car, the train drive control device 400 is a motor control device. The brake control device 500 is a device that controls a mechanical brake or an electrical brake that brakes the control target train.

The operation of the on-board device 10 is described below with reference to FIG. 10.

Figure 10:
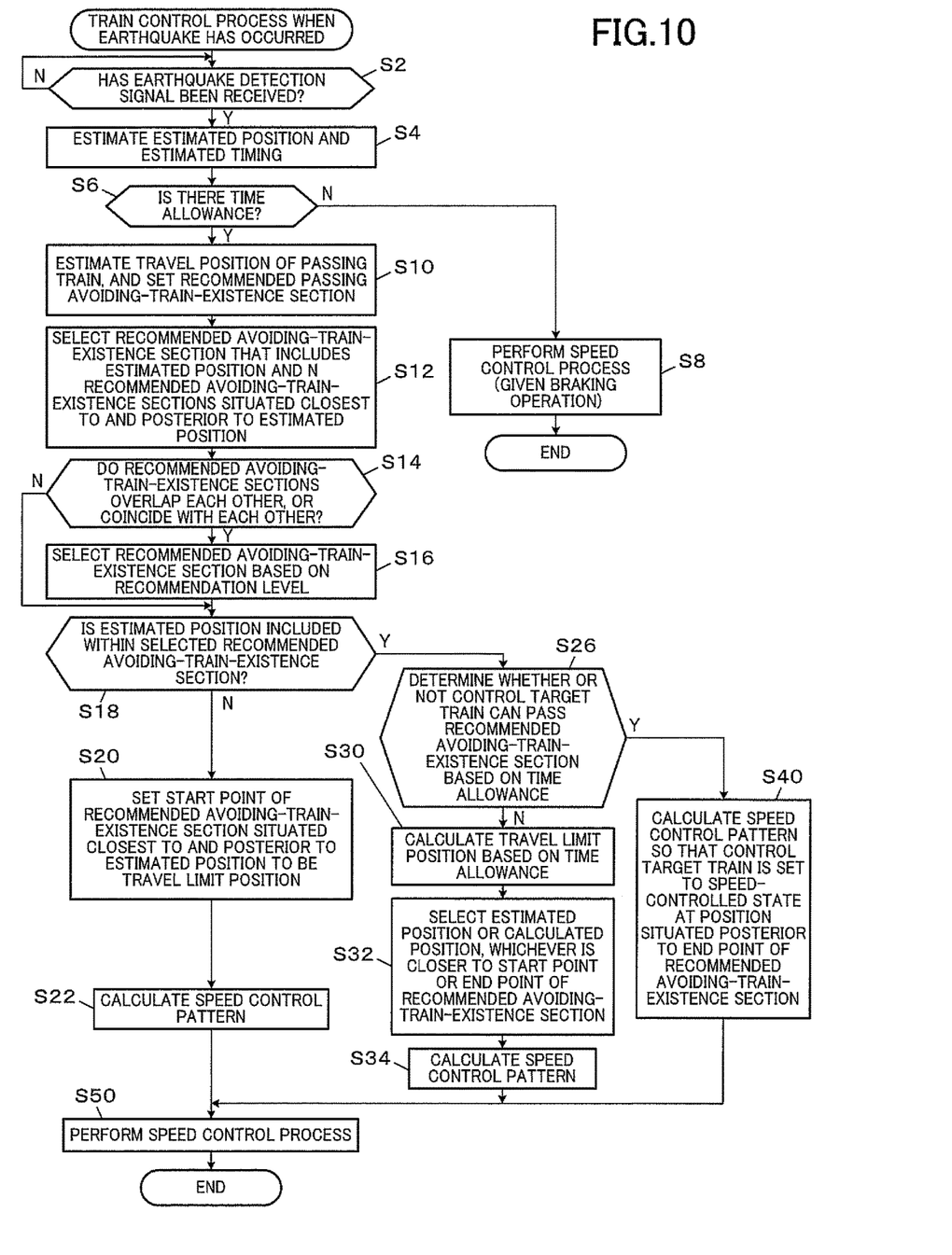
FIG. 10 is a flowchart illustrating the flow of a train control process according to one embodiment of the invention.

FIG. 10 is a flowchart illustrating the flow of the train control process performed by the on-board device 10 when an earthquake has occurred. Note that the on-board device 10 continually updates the travel state information 240, transmits the updated travel state information 240 to the ground device 20, and receives the passing train travel state information 250 from the ground device 20 during the train control process.

The on-board device 10 monitors whether or not the earthquake detection signal has been received (step S2). When the on-board device 10 has received the earthquake detection signal (step S2: YES), the estimation part 131 estimates the estimated position and the estimated timing (at which the control target train is set to the speed-controlled state when the given brake is immediately and continuously applied) using the travel state information 240 (step S4). The on-board device 10 then determines whether or not there is a time allowance between the estimated timing and the estimated earthquake arrival timing represented by (included in) the earthquake detection signal (step S6). When there is no time allowance between the estimated timing and the estimated earthquake arrival timing (step S6: NO), the on-board device 10 performs the speed control process that causes the control target train to immediately and continuously apply the given brake (step S8).

When there is a time allowance between the estimated timing and the estimated earthquake arrival timing (step S6: YES), the recommended passing avoiding-train-existence section setting part 132 estimates the position of the passing train at the estimated timing using the passing train travel state information 250, and sets a given range including the estimated position to be the recommended avoiding-train-existence section in order to prevent a situation in which the control target train and the passing train pass each other at the estimated earthquake arrival timing (step S10).

The avoiding-train-existence section selection part 133 selects the recommended avoiding-train-existence section that includes the estimated position and N recommended avoiding-train-existence sections which are situated closest to and posterior to the estimated position from the recommended avoiding-train-existence sections set to the recommended avoiding-train-existence section table 210 and the recommended avoiding-train-existence section set in the step S10 (step S12). When the selected recommended avoiding-train-existence sections overlap each other, or coincide with each other (step S14: YES), the avoiding-train-existence section selection part 133 selects the recommended avoiding-train-existence section to which a higher recommendation level is assigned (i.e., excludes the recommended avoiding-train-existence section to which a lower recommendation level is assigned) (step S16).

The speed control pattern calculation part 137 then determines whether or not the estimated position is included within the selected recommended avoiding-train-existence section (step S18). When the estimated position is not included within the selected recommended avoiding-train-existence section (step S18: NO), the speed control pattern calculation part 137 sets the start point of the recommended avoiding-train-existence section which is situated closest to and posterior to the estimated position to be a travel limit position (step S20), and calculates the speed control pattern that reduces the deceleration so that the control target train is set to the speed-controlled state before the travel limit position is reached (step S22). The steps S20 to S22 correspond to the speed control process described above with reference to FIG. 5.

When the estimated position is included within the selected recommended avoiding-train-existence section (step S18: YES), the speed control pattern calculation part 137 determines whether or not the control target train can pass the recommended avoiding-train-existence section before the estimated timing is reached, and can then be set to the speed-controlled state, based on the time allowance, the travel state information 250, the travel performance specification 230, and the like (step S26). When the control target train can pass the recommended avoiding-train-existence section before the estimated timing is reached (step S26: YES), the speed control pattern calculation part 137 calculates the speed control pattern so that the control target train is set to the speed-controlled state at the estimated timing at a position situated posterior to the end point of the recommended avoiding-train-existence section (step S40). The step S40 corresponds to the speed control process described above with reference to FIG. 4.

When it has been determined that the control target train cannot pass the recommended avoiding-train-existence section before the estimated timing is reached (step S26: NO), the speed control pattern calculation part 137 calculates the travel limit position of the control target train based on the time allowance (step S30). The speed control pattern calculation part 137 then selects the estimated position or the position calculated in the step S30, whichever is closer to the start point or the end point of the recommended avoiding-train-existence section (step S32). The speed control pattern calculation part 137 then calculates the speed control pattern that corresponds to the selected position (step S34). The steps S30 to S34 correspond to the speed control process described above with reference to FIG. 8.

When the step S22, S34, or S40 has been performed, the execution control part 139 performs the speed control process according to the calculated speed control pattern (step S50). The control target train can thus be situated at a position that avoids the recommended avoiding-train-existence section as much as possible before the estimated timing is reached in a state in which the control target train is set to the speed-controlled state.

According to the exemplary embodiments of the invention, it is possible to set the recommended avoiding-train-existence section (e.g., a section on a bridge situated at a considerable height, or a section situated in the deepest area of a long tunnel) within the line section of the control target train, and control the speed of the control target train so that the control target train is set to the given speed-controlled state when the earthquake detection signal including the information about the estimated earthquake arrival timing has been received from the ground device. The speed control process estimates the estimated position and the estimated timing at which the control target train is set to the speed-controlled state when the given brake (e.g., emergency brake or maximum service brake) is continuously applied. The speed of the control target train is controlled based on the positional relationship between the estimated position and the recommended avoiding-train-existence section when there is a time allowance between the estimated timing and the estimated earthquake arrival timing.

This makes it possible to implement novel train control technology that can set the train to the speed-controlled state at the estimated earthquake arrival timing at a position outside the recommended avoiding-train-existence section when there is a time allowance until the train is set to the speed-controlled state.

Although the embodiments to which the invention is applied have been described above, the embodiments to which the invention can be applied are not limited to the embodiments described above.

Although an example in which the recommended avoiding-train-existence section is selected based on the recommendation level when the recommended avoiding-train-existence sections overlap each other, or coincide with each other (i.e., the step S14 (YES) to the step S16 illustrated in FIG. 10) has been described above, the recommended avoiding-train-existence section may be selected (extracted) based on the recommendation level in a step that precedes the step S14. For example, only the recommended avoiding-train-existence sections for which the recommendation level corresponding to the estimated seismic intensity represented by (included in) the received earthquake detection signal is equal to or higher than a given level may be preliminarily selected, and the recommended avoiding-train-existence section may be selected from the preliminarily selected recommended avoiding-train-existence sections in the step S12 illustrated in FIG. 10. In this case, it is possible to reduce the number of recommended avoiding-train-existence sections that may be selected in the step S12.

The recommended avoiding-train-existence sections are set to the recommended avoiding-train-existence section table 210 according to an arbitrary standard. For example, the recommended avoiding-train-existence sections may be set to the recommended avoiding-train-existence section table 210 according to a standard that also takes account of the ballast type (ballast/slab), the presence or absence of a guard angle, the curvature, and the like.

Although an example in which the on-board device 10 performs the speed control process has been described, the ground device 20 may perform the speed control process instead of the on-board device 10 when implementing a railroad system that is designed so that the ground device 20 performs the speed control process on each train.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A train control device that is installed in a train, and controls a speed of the train, the train control device comprising:
   a communication part that receives an earthquake detection signal from outside the train, the earthquake detection signal including information about an estimated earthquake arrival timing and information about an earthquake index value, the estimated earthquake arrival timing being a timing at which an earthquake arrives at a position of the train or a region including the position of the train, and the earthquake index value being an index value that represents a magnitude of the earthquake;
   a storage part that stores a recommendation level that corresponds to the earthquake index value so as to be linked to a given recommended avoiding-train-existence section; and
   a speed control part that controls the speed of the train so that the train is set to a given speed-controlled state while a given brake is continuously applied as a result of the receipt of the earthquake detection signal, wherein
   the speed control part:
      estimates an estimated stop position and an estimated stop timing based on a given speed control pattern,
      determines a recommended avoiding-train-existence section that corresponds to the earthquake index value of the received earthquake detection signal,
      determines whether there is a time allowance based on the estimated stop timing and the estimated earthquake arrival timing of the received earthquake detection signal, and
      controlling the speed of the train based on a positional relationship between the estimated stop position and the recommended avoiding-train-existence section so that the train is prevented from being stopped in the recommended avoiding-train-existence section, if it is determined that there is the time allowance.

2. The train control device as defined in claim 1,
   wherein the speed control part calculates the speed control pattern that causes the train to be situated at a position beyond an end point of the recommended avoiding-train-existence section at the estimated earthquake arrival timing in a state in which the train is set to the speed-controlled state when the estimated stop position is included within the recommended avoiding-train-existence section, and controls the speed of the train based on the speed control pattern.

3. The train control device as defined in claim 2,
   wherein the speed control part calculates the speed control pattern so as to include either or both of acceleration and coasting based on a distance from the estimated stop position to the end point of the recommended avoiding-train-existence section, the time allowance, a current travel state, and a travel performance specification of the train.

4. The train control device as defined in claim 1,
   wherein the speed control part causes the train to apply a brake that is reduced in deceleration as compared with the given brake when the estimated stop position is situated anterior to a start point of the recommended avoiding-train-existence section so that the train is situated anterior to the start point at the estimated earthquake arrival timing.

5. A train control device that is installed in a train, and controls a speed of the train, the train control device comprising:
   a communication part that receives an earthquake detection signal from outside the train, the earthquake detection signal including information about an estimated earthquake arrival timing, the estimated earthquake arrival timing being a timing at which an earthquake arrives at a position of the train or a region including the position of the train;
   a passing train travel state information acquisition part that acquires passing train travel state information that includes a travel position of a passing train; and
   a speed control part that controls the speed of the train so that the train is set to a given speed-controlled state while a given brake is continuously applied as a result of the receipt of the earthquake detection signal, wherein
   the seed control part:
      estimates an estimated stop position and an estimated stop timing based on a given speed control pattern,
      estimates the travel position of the passing train at the estimated stop timing based on the passing train travel state information,
      sets a given range including the estimated travel position of the passing train to be a recommended avoiding-train-existence section,
      determines whether there is a time allowance based on the estimated stop timing and the estimated earthquake arrival timing of the received earthquake detection signal, and
      controls the speed of the train based on a positional relationship between the estimated stop position and the recommended avoiding-train-existence section so that the train is prevented from being stopped in the recommended avoiding-train-existence section, if it is determined that there is the time allowance.

6. A control method that causes a control device that is installed in a train to control a speed of the train referring to a content stored in a storage part, the storage part storing a recommendation level that corresponds to an earthquake index value so as to be linked to a given recommended avoiding-train-existence section, the control method comprising:
   receiving an earthquake detection signal from outside the train, the earthquake detection signal including information about an estimated earthquake arrival timing and information about the earthquake index value, the estimated earthquake arrival timing being a timing at which an earthquake arrives at a position of the train or a region including the position of the train, and the earthquake index value being an index value that represents a magnitude of the earthquake;
   estimating an estimated stop position and an estimated stop timing at which the train is set to a given speed-controlled state while a given brake is continuously applied as a result of receipt of the earthquake detection signal;

determining a recommended avoiding-train-existence section that corresponds to the earthquake index value of the received earthquake detection signal, determining whether there is a time allowance based on the estimated stop timing and the estimated earthquake arrival timing of the received earthquake detection signal, and controlling the speed of the train based on a positional relationship between the estimated stop position and the recommended avoiding-train-existence section so that the train is prevented from being stopped in the recommended avoiding-train-existence section, if it is determined that there is the time allowance.

7. A control method that causes a control device that is installed in a train to control a speed of the train, the control method comprising:

receiving an earthquake detection signal from outside the train, the earthquake detection signal including information about an estimated earthquake arrival timing, the estimated earthquake arrival timing being a timing at which an earthquake arrives at a position of the train or a region including the position of the train;

acquiring passing train travel state information that includes a travel position of a passing train;

estimating an estimated stop position and an estimated stop timing at which the train is set to a given speed-controlled state while a given brake is continuously applied as a result of receipt of the earthquake detection signal;

estimating the travel position of the passing train at the estimated stop timing based on the passing train travel state information;

setting a given range including the estimated travel position of the passing train to be a recommended avoiding-train-existence section;

determining whether there is a time allowance based on the estimated stop timing and the estimated earthquake arrival timing of the received earthquake detection signal, and controlling the speed of the train based on a positional relationship between the estimated stop position and the recommended avoiding-train-existence section so that the train is prevented from being stopped in the recommended avoiding-train-existence section, if it is determined that there is the time allowance.

* * * * *